Patented Nov. 17, 1931

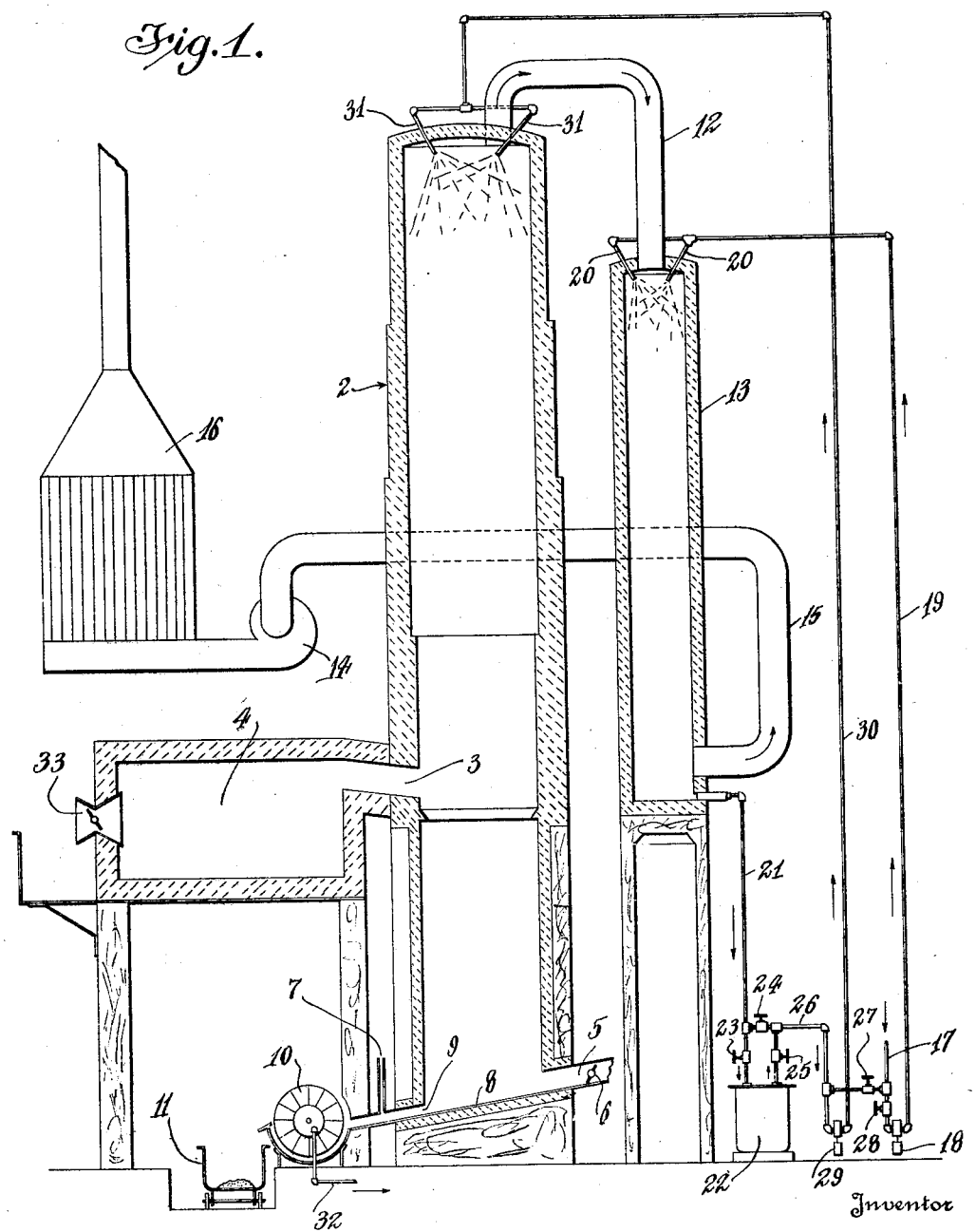

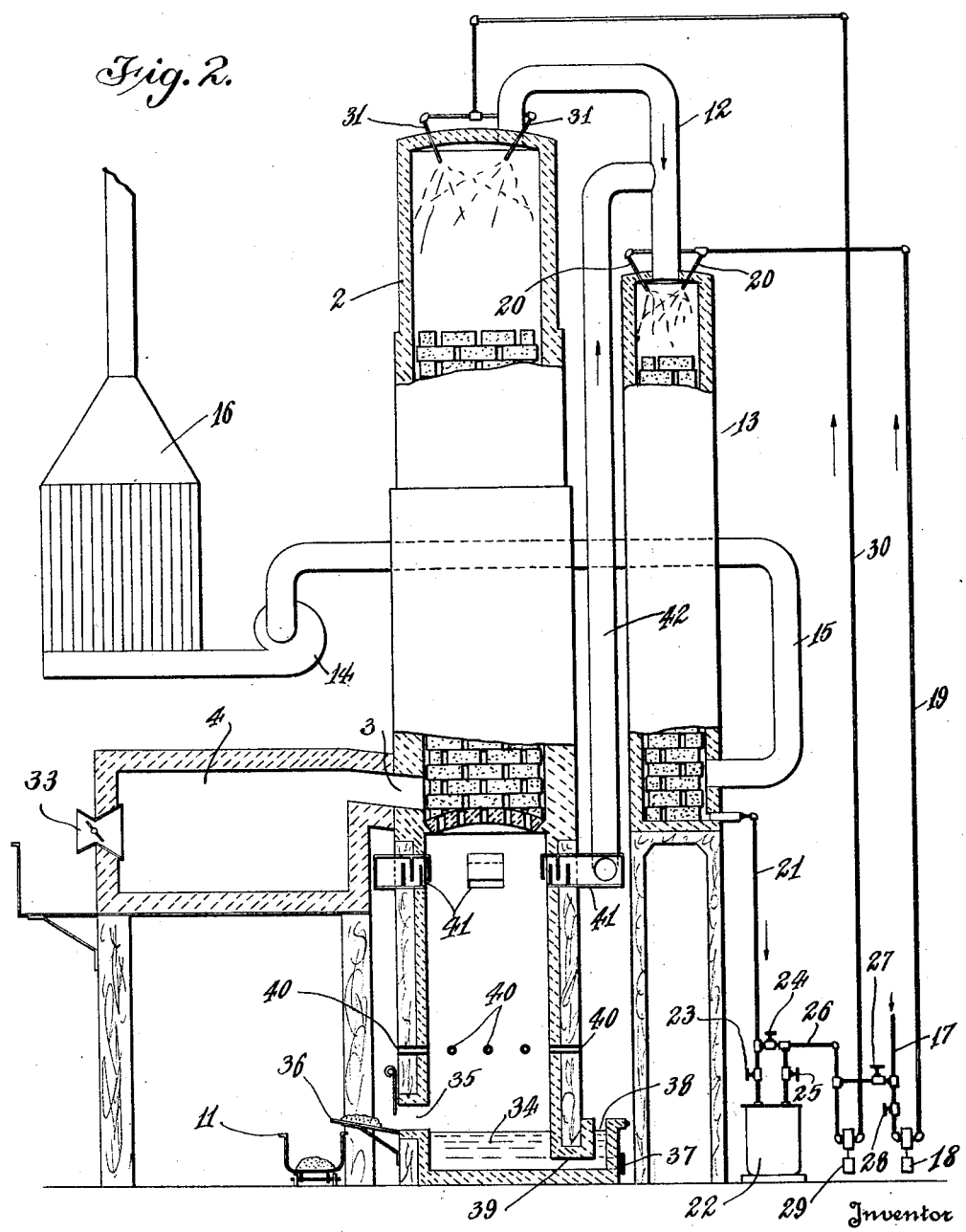

1,831,892

UNITED STATES PATENT OFFICE

HARRY W. THOMPSON, OF BAKERSFIELD, CALIFORNIA, ASSIGNOR TO STANDARD OIL COMPANY OF CALIFORNIA, OF SAN FRANCISCO, CALIFORNIA, A CORPORATION OF DELAWARE

METHOD AND APPARATUS FOR CONCENTRATING LIQUIDS

Application filed February 11, 1928. Serial No. 253,633.

This invention relates to the concentration of liquids, particularly of liquids containing foreign constituents, impurities, or salts in suspension or solution, which foreign constituents may produce solid matter during concentration. The invention particularly relates to the concentration of sulfuric acid such as the acid recovered from sludge produced by the action thereof upon petroleum oils or distillates in various refining processes.

Concentration of liquids is practically universally produced by evaporation of a portion of the liquids, which portion may be called the "dilutent". When foreign constituents are present in the liquid being concentrated, it is difficult to obtain a concentrated liquid free from the foreign constituents, and the presence of these constituents is obviously objectionable and presents a large number of difficulties which are encountered during and after concentration. For instance, in the concentration of sulfuric acid previously used in the treatment of petroleum oils and particularly in the concentration of sulfuric acid present in the so-called acid sludge resulting from this operation, it has been common practice to concentrate such acids by allowing the dilute acid containing particles of sludge, carbon compounds, etc. to trickle downwardly through a tower packed with brick work or other material designed to break up the downflowing liquid into a multiplicity of films or channels and to expose such downflowing liquid to the action of a countercurrent flow of hot gases from a furnace. The presence of these foreign impurities has caused a great deal of difficulty in that the brick work or other packing used in the towers becomes clogged very rapidly thereby, interfering with the proper circulation of liquid and hot furnace gases, reducing the evaporation capacity of the towers, and eventually clogging up the passages and requiring suspension of operations for cleaning. Another serious difficulty is the tendency of the solids to lodge in the joints of the packing, later causing them to expand and eventually exerting sufficient pressure upon the tower walls to cause disruption, the latter in spite of the most approved methods of staying which may have been employed. The final concentration of liquid partly concentrated by this method is effected in pans at the lower ends of the towers through which the hot furnace gases are first passed before taking their upward course through the packing. The concentrated acid is then drawn off from the pans to suitable coolers in which the temperature is reduced to a degree sufficient to enable the acid to be handled and stored. With this method the pans rapidly fill with the continually separating solid material, rendering frequent and troublesome cleaning necessary.

This invention relates to a combined concentrating and cooling apparatus and to a method of concentrating and cooling liquids before the removal of foreign constituents therefrom and obviates practically all of the difficulties encountered in the previous processes of concentrating liquids containing foreign constituents, and embodies advantages obtained even when liquids substantially free from solid impurities are concentrated.

An object of this invention is to provide a method of concentrating liquids containing foreign constituents, cooling the liquid and separating foreign matter from the cooled liquid.

Another object is to provide an apparatus for concentrating and cooling liquids containing foreign constituents. Another object is to provide a continuous apparatus for the concentration and cooling of liquids containing foreign constituents and for the removal of said foreign constituents.

Another objection is to disclose a method of concentrating sludge acid recovered from the sulfuric acid treatment of mineral oils whereby accumulation of solid or tarry material in the concentrating step is substantially prevented. Another object is to disclose a process of removing carbon and carbonaceous compounds from a mixture of dilute acid and such materials without interfering with the process of concentrating the acid. Another object is to disclose a process whereby sludge acid recovered from the sulfuric acid treatment of mineral oil and containing carbonaceous compounds may be continuously and practically simultaneously concentrated and cooled and carbonaceous matter removed from the cooled concentrated liquid.

Other objects, advantages, modifications and uses of this invention will be apparent from the following detailed description of the process and apparatus. The process and apparatus will be described in detail with particular reference to the concentration of sulfuric acid recovered from the sludge produced by the action of sulfuric acid upon petroleum oils, but it is to be understood that the invention is not limited to a process or apparatus adapted for this purpose alone as any liquid containing suspended, dissolved or emulsified foreign constituents therein, such as for example brines, solutions of salts or alkalies, and the like, may be advantageously treated by this process or in the apparatus disclosed herein. Furthermore, the process and apparatus may also be employed on solutions or liquids substantially free from foreign constituents.

When petroleum oils or distillates are treated with sulfuric acid, there may result a sludge containing products of the reaction such as sulfonic acids, carbonaceous products and a considerable portion of unconverted sulfuric acid. The presence of this free acid is due to the necessity for the application of an excess of acid in the original treatment in order to produce the desired reaction, as is well known in the oil refining industry.

The sulfuric acid present in the so-called acid sludge may be recovered by mixing the mass with water and heating the mixture so as to stratify the acid in dilute solution thereby facilitating a separation between the acid and a portion of the carbon compounds in the form of tars and acid oils and enabling withdrawal of the dilute acid solution for further treatment. It is apparent that the sulfuric acid thus drawn off is more or less heavily charged with water, at least to a degree which weakens it for further use as a treating agent and in addition carries with it carbon compounds, carbon and other constituents dissolved, suspended or emulsified therein.

When the dilute acid thus recovered is heated in accordance with the prior art, to drive off the surplus water and reduce the acid to the proper degree of concentration for further use, a large portion of the carbon compounds tends to form heavier compounds approaching elemental carbon in composition. These compounds may separate from the acid in the form of tars and solid material. The presence of such foreign matter in the concentrated sulfuric acid is obviously objectionable and its removal has heretofore offered a serious obstacle to the economic concentration of recovered sludge acid, particularly acids containing high percentages of carbon compounds as in the case of those resulting from the acid treatment of certain California crude oil products.

As has been said before, the concentration of such acids has been endeavored by passing the dilute acid through a tower or series of towers, generally packed with brick work or other material, against a counterflow of hot furnace gases. This operation results in the separation of carbonaceous matter from the acid in the towers, which carbonaceous matter collects in the interstices of the packing, and due to their hard and tarry nature these deposits are difficult to remove without damage to the packing material and their accumulation in the inaccessible portion of the packing seriously reduces the effective area exposed to the concentrating action.

Furthermore, a certain portion of the carbonaceous material is carried along with the highly heated acid into the final concentrating pans wherein such portion of the carbonaceous material tends to settle out and deposit eventually filling up the pans and interfering with the process.

Some of the difficulties experienced with packed towers have been avoided by using an open tower into the top of which the dilute acid is introduced in a fine spray countercurrent to a rising stream of hot furnace gases. Such towers may have sloping bottoms to carry off the concentrated acid and accumulated foreign matter, thus avoiding shut downs of the tower for the purpose of cleaning. The concentrates, after leaving the tower pass to settling chambers where the separation of carbonaceous material is accomplished, and thence to equipment in which the acid is cooled to the proper handling temperature.

By having the cooling and separating equipment in duplicate it is possible to secure continuous operation by using one set of apparatus while the other is being cleaned, but the arrangement does not solve the problem of economical separation of carbonaceous matter. This is for the reason that substantially complete separation of carbonaceous matter cannot be efficiently accomplished while the concentrated matter is in a highly heated condition. The separation of carbonaceous material from the concentrated acid could be facilitated if the acid and carbonaceous material be first cooled. If it were possible to install efficient acid coolers between the concentrating tower and the settling chambers efficient separation could be secured and the foreign matter continuously skimmed off by hand or otherwise removed from the cooled material in the settling chambers. However, this is not practicable with coolers of customary design as these coolers, of the water-coil type, rapidly choke with carbon under such circumstances and their efficiency, as regards heat transfer, is reduced by the deposition of tarry carbon on the coils.

This invention obviates all of the difficulties heretofore encountered in the concentration of liquids, such as sludge acid, and provides a method and means for cooling the concentrated acid and carbonaceous matter to such degree that separation may be accomplished mechanically or by hand skimming in the settling chamber. The present invention avoids cooling difficulties by doing away with surface cooling as done in water-coil devices, and utilizes instead direct air cooling with perfect heat transfer regardless of the quantity of solids present. The entire operation is continuous and efficient and the apparatus functions without any substantial deposit of carbonaceous matter in the concentrating tower. In describing the invention, reference will be had to the appended drawings, in which:—

Figure 1 is a diagrammatic representation, partly in section, of one form of apparatus designed to carry out the invention; and Figure 2 is also a vertical section of the apparatus with certain modifications embodied therein.

Referring to Figure 1,—2 represents an open tower of acid resistant brick or other suitable material, provided with a hot gas inlet 3 from a furnace 4, said inlet entering the tower at a suitable intermediate point or points between the base and top. It is to be understood that instead of using a furnace, suitably heated gases, such as waste gases from boilers or other equipment, may be utilized. The temperature of the gases entering the upper portion of the tower 2, said upper portion being the concentrating zone, should not be above the maximum allowable for the particular type of construction used as it is possible to operate this equipment and process at any temperature above the boiling point of the concentrated acid, and hot furnace gases entering through the inlet 3 may be at any temperature up to about 2000° F. This is possible inasmuch as cold air is supplied to the apparatus through the inlet 5 provided with a suitable regulating device or damper 6. This cold air inlet 5 is at a point below the hot gas inlet 3 and preferably approximately at the level of the bottom of the tower. In addition, a certain amount of cold air may enter through an auxiliary cold air inlet 7.

The tower 2 may be provided with a sloping bottom 8 which leads to an outlet 9 connecting the bottom of the tower with a filter 10 or other suitable mechanical device for separating solids from the liquid discharged from the tower through outlet 9. The filter 10 may consist of any suitable continuous filtering apparatus such as an Oliver or American continuous filter suitably constructed of acid resisting material, or the device known as the Filtros wheel may be used. The separation is not necessarily limited to such types of apparatus but may be performed in mechanical settling devices such as the Dorr thickener or the Hardinge continuous settler or similar devices. In some cases a centrifugal machine may be employed but in no event is it intended to limit the invention to any particular form of device for the separation of the solid matter from the concentrated and cooled liquid. The solid matter discharged from the separating device 10 may be deposited into a bin or suitable vehicle 11 and disposed of.

Cold air entering the bottom of the tower through the main inlet 5 and the auxiliary inlet 7 passes upwardly within said tower and mixes with the hot gases entering through the inlet 3 in the upper section of said tower. These gases then pass through a vent or suitable pipe means 12 into the top of a recuperator tower 13, which may also be constructed of acid resistant brick or any other suitable material. After passing through the recuperator the gases may then be discharged therefrom by means of an exhauster 14 and suitable pipe means 15 into a precipitator 16 or other suitable device for separating the final acid content from the gases and vapors.

It will be understood that both the tower and the recuperator may be packed with brick work or other suitable packing so as to distribute the acid or other liquid supplied thereto into a multiplicity of films and thereby expose the liquid to the action of the gases over a large surface. Preferably, however, both the tower and the recuperator are unpacked thereby preventing any minor amount of clogging by deposition of foreign matter therein.

Dilute recovered acid or other liquid to be concentrated may enter the system through the feed line 17 and be delivered by pump 18 and pipe means 19 through downwardly directed acid sprays 20 of any suitable construction and design into the upper portion of the recuperator 13. Any acid vapors entering the recuperator 13 through the gas outlet 12 from the tower 2 are partly condensed and cooled by the acid spray supplied by the spray or atomizing devices 20. The acid sprayed into the recuperator 13, together with any condensed vapors carried down with it to the bottom of the recuperator tower, is discharged from the recuperator by pipe means 21 which may or may not be connected with a cooler 22 of any suitable description. Valves 23, 24 and 25 may be provided so as to control the direction of flow of the acid liquors. These acid liquors may be recirculated through the recuperator by passing through pipe means 26 and opened valves 27 and 28 and pump 18 (pump 29 not functioning), or if desired the acid liquor may be passed through the cooler 22 (valve 24 being closed) or diverted around the cooler (in which case valves 23 and 25 are closed and valve 24 opened) and then pumped by means of the pump 29 through pipe line 30 and discharged into the tower 2 through suitable spraying devices 31.

Acid entering the tower 2 through the downwardly directed inlets 31 encounters the upwardly moving heated gases entering the tower through inlet 3, usually at progressively increasing temperatures, and after passing through the upper portion of said tower, namely through the concentrating zone, such concentrated acid then drops into the lower portion of the tower (the cooling zone) in which it is subjected to the action of the cold air entering the apparatus through the inlet 5. In this manner the concentrated acid leaves through the outlet 9 at the proper temperature for handling in the atmosphere and separating out the solid constituents in the device 10. The concentrated acid may be removed from the device 10 through pipe line 32 to storage for reuse or any other purpose. In this manner, cold air supplied through inlet 5, abstracts heat from the concentrated acid and cools this concentrated acid, and later this abstracted heat is utilized in the concentration of further acid.

The cycle of operations described may be modified in a number of particulars, and it is evident that the supply of dilute acid from the recuperator 13 discharged through pipe line 21 may be augmented by the addition of fresh dilute acid from the inlet 17 by opening the valve 27 and allowing the pump 29 to discharge both the acid from the recuperator and the fresh dilute acid through pipe line 30 and spray inlets 31 into the tower 2, or the entire supply of acid to the tower 2 may be obtained from the dilute acid inlet 17 without passing through the recuperator if the circumstances make this modification desirable. It is also evident that the entire recuperator system may be so constructed as to operate on the countercurrent principle, if desired.

It is also evident that the process is subject to close control by regulating the gas exhauster 14 and therefore the volume of gases passing through the system, the hot gas inlet 3 by means of a suitable control such as 33, the cold air inlet control 6, the auxiliary cold air inlet 7 and the quantity and temperature of the weak acid sprayed into the concentrating section of the tower 2.

Figure 2 illustrates a modified form of the apparatus, similar to that described and illustrated in Figure 1 with the exception that means are provided for handling the concentrated acid suitably where it is found preferable to discharge the mixture of cooled concentrated acid and separated carbonaceous or other foreign matter into a sump or settling tank. While the sump or settling tank may be used in place of the separating device 10 in Figure 1, it is believed that the arrangement shown in Figure 2 wherein the device is made a part of the lower section of the tower, is preferable.

Referring to Figure 2, the settling tank or sump 34 is built into the bottom of the tower and collects the mixture of concentrated acid and carbonaceous or other foreign matter produced as described in the operation of Figure 1. It has been found that the greater portion of the insoluble material separated during the heating and cooling or sludge acid is lighter than the concentrated acid and tends to float on the surface or remains suspended in the upper part of the liquid. For this reason the greater portion of foreign matter may be continuously or periodically skimmed off or fished out of the sump 34 by hand through the cold air inlet 35 and allowed to drain on the platform 36 from which it may be removed from time to time into bins or other receptacles 11 and disposed of as desired.

The relatively small portion of insoluble or foreign matter heavier than the liquid, such as carbonaceous particles loaded with metallic salts, settles in the bottom of the sump 34 and may be removed when required by opening the outlet 37 and draining off the entire contents of the sump. It may be pointed out that such draining may not interfere with the continuous operation of the system and that the small quantity of acid and sediment thus withdrawn may be separated or otherwise disposed of according to circumstances.

The concentrated acid discharged from the sump 34 through suitable outlet means connected with the discharge opening 38 is substantially free from floating impurities which are retained in the sump 34 by the submerged weir or baffle 39. The heavier impurities have been retained on the bottom of the sump 34 and therefore the concentrated acid discharged at 38 is substantially free from solid impurities and ready to be carried to storage for reuse or any other suitable purpose.

In addition to the cold air supplied to the lower section of the tower 2 through the inlet 35, cold air may be supplied through inlets 40 suitably disposed in the periphery of the lower section of the cooling zone of the tower 2. This cold air supplied through the inlets 40 may be discharged by suitable baffle outlets 41 (suitably connected as by a manifold) and so arranged as to prevent channeling of air or dead air spaces in the cooling zone of said tower. Suitable means for returning acid stripped from the air, or gases passing through the outlets 41, back to the sump 34 may be provided. The cooling gases discharged through the outlets 41 are then preferably passed through suitable means 42 into the recuperator 13. This may be accomplished by connecting the pipe means 42 with the gas outlet connection 12 leading from the tower 2 into the recuperator, the exhauster 14 assisting movement of gases as described. With this arrangement these gases may be cooled in the recuperator 13 thereby reducing the volume of gases discharged by the exhauster 14 into the precipitator 16, and furthermore prevent excessive cooling of hot gases in the concentrating zone of the tower 2.

As has been said before, the process is capable of close control and furthermore the capacity of the apparatus is influenced by the cross sectional area of the tower, the quantity and temperature of the heated gases supplied thereto and the volume of cold air passed through the cooling section of the tower. The height of the tower does not influence the capacity thereof materially but for purposes of illustration it may be said that a combined concentrating and cooling tower of the type described may be from about 40 to 70 feet. It has been found that approximately one-fifth of the total height of the tower is sufficient for effective use as a cooling zone.

While particular apparatus for the concentration of sludge acid from the treatment of petroleum oil has been described, it is apparent that the same arrangement with or without modification may be used for the concentration of other liquids or combinations of liquids and solids without departing from the spirit of the invention. The invention is not limited to the particular form of apparatus described, therefore, but embraces all modifications and changes both in the process or method and apparatus coming within the scope of the following claims.

I claim:

1. A method of concentrating liquids comprising, passing air at a relatively low temperature countercurrent to a flow of hot concentrated liquid in finely divided form in order to cool said liquid, and then passing the same air, together with added heated gases, countercurrent to a flow of dilute liquid to heat and concentrate the same.

2. A continuous process of concentrating liquids comprising, contacting the liquid to be concentrated with gases previously used in concentrating the liquid, then contacting the liquid in finely divided form with a countercurrent flow of heated gases adapted to concentrate the liquid, and then contacting the concentrated liquid in finely divided form with a countercurrent flow of gas adapted to cool the concentrated liquid.

3. A continuous process of concentrating sulphuric acid containing foreign materials comprising, feeding the liquid into the top of a closed tower, subdividing the sulphuric into fine streams and particles to expose large surfaces thereof to heated gases, supplying heated gases to said tower at an intermediate point therein which are cooled during their flow through said tower countercurrent to said sulphuric acid, supplying cool air to said tower near the base thereof which is heated during their flow through said tower countercurrent to said sulphuric acid, collecting the concentrated and cooled liquid at the base of said tower, and separating foreign material from said cooled sulphuric acid.

4. A continuous process of concentrating acid liquors containing foreign material comprising, feeding the acid into the top of a closed tower, subdividing the acid into fine streams to expose large surfaces thereof to heated gases, supplying heated gases to said tower at a point below the vertical median of said tower whereby said gases are cooled during their flow through said tower countercurrent to said acid, supplying cool air to said tower near the base thereof but below the point of entry of said heated gases, whereby said air is heated during its flow through said tower countercurrent to said acid, discharging gases from the top of said tower and collecting the concentrated and cooled acid at the base of said tower.

5. A continuous process of concentrating sulfuric acid comprising, feeding the acid into the top of a closed tower, subdividing the acid into fine streams by passing over acid resisting packing in said tower, supplying heated gases to said tower at an intermediate point therein which are cooled during their flow through said tower countercurrent to said acid, supplying cool gases to said tower near the base thereof which are heated during their flow through said tower countercurrent to said acid, collecting the concentrated and cooled acid at the base of said tower, and separating foreign material from said cooled liquid.

6. A continuous process of concentrating sludge acid comprising, spraying the acid downwardly through a combined concentrating and cooling zone countercurrent to a flow of gases, admitting heated gases to the upper section of said zone, admitting cool gases to the lower section of said zone, and collecting the concentrated and cooled acid near the base of said combined concentrating and cooling zone.

7. An apparatus for concentrating liquids comprising, a tower provided with a vent, means for introducing the liquid into the tower near the top thereof, means for breaking up the flow of liquid in said tower, means for admitting cool gases near the base of said tower, means for discharging relatively cool gases from said tower at a point above the point of entry of said cool gases, means for introducing heated gases at a point above the cooler gas outlet, means for collecting liquid in the base of the tower, and means operatively connected with the base of the tower adapted to remove foreign impurities from the liquid collected therein.

8. A continuous process of concentrating liquids, comprising contacting the liquid to be concentrated with gases previously used in concentrating the liquid, and concurrently contacting the liquid with gases previously used in cooling the previously concentrated liquid, then contacting the liquid in finely divided form with a countercurrent flow of heated gases adapted to concentrate the liquid, and then contacting the concentrated liquid in finely divided form with a counter-current flow of gas adapted to cool the concentrated liquid.

9. In a method of concentrating impure sulphuric acid, the steps of continuously passing impure sulphuric acid downwardly in a tower, subjecting said impure acid to a counter-current flow of heated gases for a major portion of the downward travel of said acid in said tower to concentrate the impure acid, and then subjecting the concentrated impure acid to a counter-current flow of cool air through a minor portion of the downward travel of the acid in said tower.

10. A method of concentrating impure sulphuric acid comprising the steps of passing impure sulphuric acid to be concentrated in finely divided form downwardly in a tower counter-current to a flow of gases at progressively increasing temperatures, and then through gases at a relatively low temperature, and contacting said last named gases containing heat absorbed from said impure sulphuric acid with fresh quantities of sulphuric acid to heat the same prior to their passage downwardly through the tower counter-current to gases at progressively increasing temperatures.

11. In an apparatus for concentrating liquids, the combination of a tower provided with a gas outlet at the top, means for admitting liquid to be concentrated to said tower near the top thereof, means for admitting heated gases into the tower at a point below the vertical median of said tower, means for admitting cooling air near the base of the tower and below said means for admitting heated gases, means for discharging gases from said tower at a point between the points of entry of cool air and heated gases, and means positioned at the base of said tower below said cooling air admitting means for receiving liquid.

Signed at Bakersfield, Calif., this 24 day of January, 1928.

HARRY W. THOMPSON.